Sept 17, 1957     H. J. M. FÖRSTER ET AL     2,806,387
VARIABLE SPEED TRANSMISSION
Filed Aug. 22, 1950     2 Sheets-Sheet 1
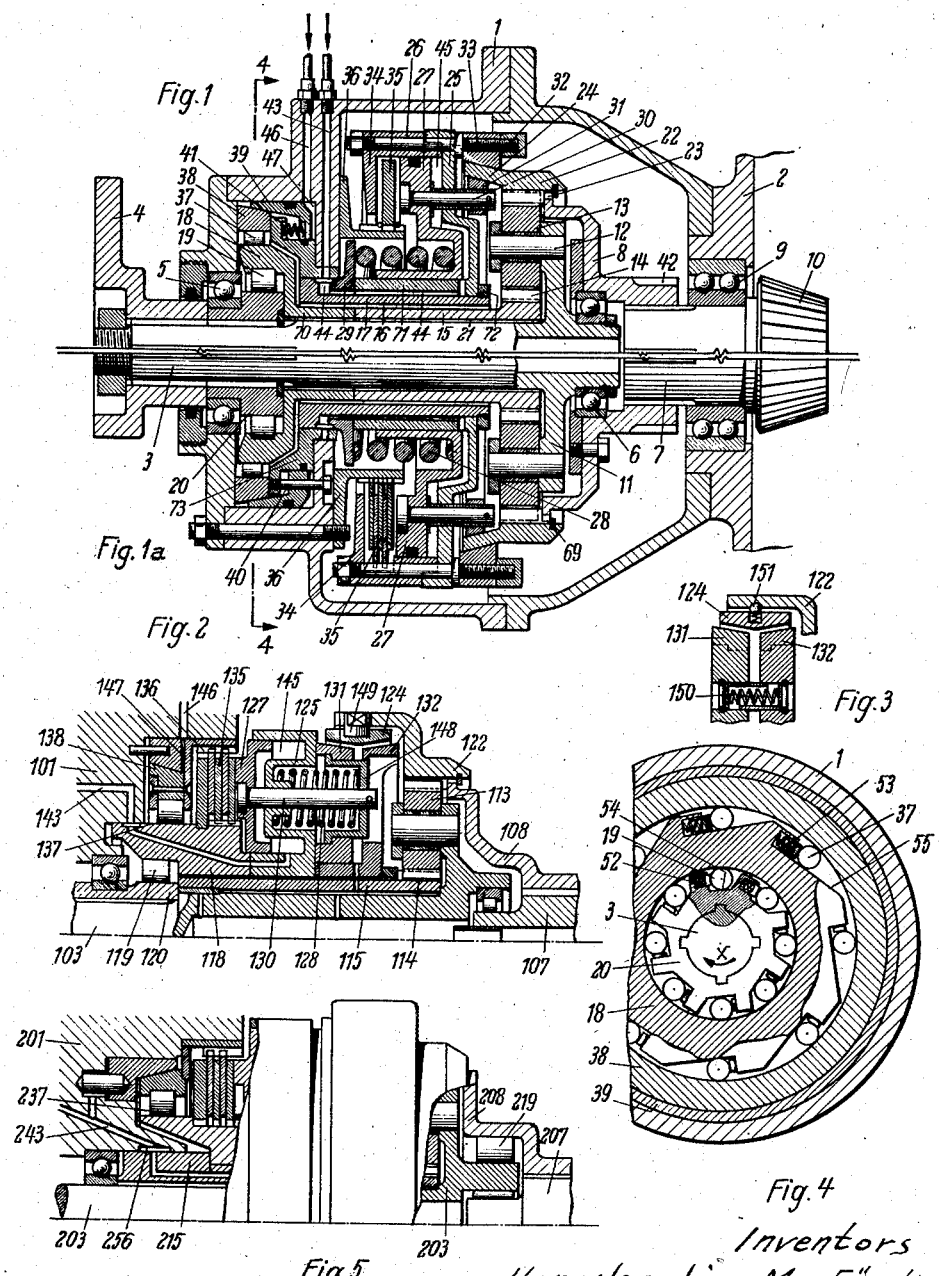

Inventors
Hans Joachim Max Förster
Karl Adolf Kollmann
Theodor Friedrich Kümmich
By Klarke and Padlon
Attorneys

United States Patent Office 2,806,387
Patented Sept. 17, 1957

2,806,387

VARIABLE SPEED TRANSMISSION

Hans J. M. Förster, Harthausen A. F., Kreis Esslingen (Neckar), Karl A. Kollmann, Stuttgart-Bad Cannstatt, and Theodor F. Kümich, Stuttgart, Germany, assignors to Daimler-Benz Aktiengesellschaft, Stuttgart-Untertürkheim, Germany Application August 22, 1950, Serial No. 180,835

19 Claims. (Cl. 74—752)

Our invention relates to a variable speed transmission, more particularly to a supplemental transmission to be installed in motor vehicles in addition to the orthodox transmission thereof and adapted to be shifted either to "direct" or to a high speed condition.

It is the object of our invention to provide a simple effective, and inexpensive transmission of that type which lends itself to low cost production and is reliable in operation and subject to a minimum of wear.

It is another object of our invention to provide a supplemental transmission which normally, i. e. when the car stops or is driving at a low speed, is set to "direct" so as to drive the vehicle with the ratio of transmission determined by the orthodox transmission and, when the car exceeds a certain speed or speeds, is automatically shifted to "high" so as to increase the speed of the vehicle with respect to that of the engine and, when the car is slowed down again below a certain speed, is shifted back to "direct," thus reducing the speed of operation of the engine and the consequent fuel consumption and wear thereof, when the car is driven at high speeds.

A further object of our invention is the provision of power-driven means for automatically shifting the transmission, the power-driven means being operated depending on the speed of rotation of a transmission shaft or on the speed of the vehicle, whereby the transmission will be set to high gear automatically as soon as the speed of the engine or of the vehicle will have reached a certain limit.

It is another object of our invention to provide means whereby the transmission will be automatically shifted back to "direct," should the power supply to the automatic shifting means fail, thereby ensuring uttermost safety in operation.

A further object of our invention is the provision of one-way clutches co-ordinated to the elements of the supplemental transmission and adapted during the shifting operation to preclude any interruption of the power transmission from the drive shaft to the driven shaft and vice versa, since such interruptions would be dangerous, particularly on steep grades.

Further objects of our invention and the features of novelty thereof will appear from the description of a number of preferred embodiments thereof described hereinafter with reference to the accompanying drawings in which Fig. 1 is a longitudinal section through the upper half of our novel supplemental transmission mounted in front of the rear axle transmission of a motor vehicle and provided with a single disk-type brake.

Fig. 1a is a partial longitudinal section through the lower half of a slightly different embodiment of a supplemental transmission in accordance with the present invention, similar to Figure 1, but provided with a multi-disk type brake.

Fig. 2 is a partial longitudinal section through a third embodiment of the novel transmission;

Fig. 3 is a partial radial section through a friction clutch shown in Fig. 2 such section being taken along an axial plane differing from that of Fig. 2;

Fig. 4 is the section taken along line 4—4 of Fig. 1;

Fig. 5 is a partial axial section through another embodiment of our novel transmission.

Figure 6:
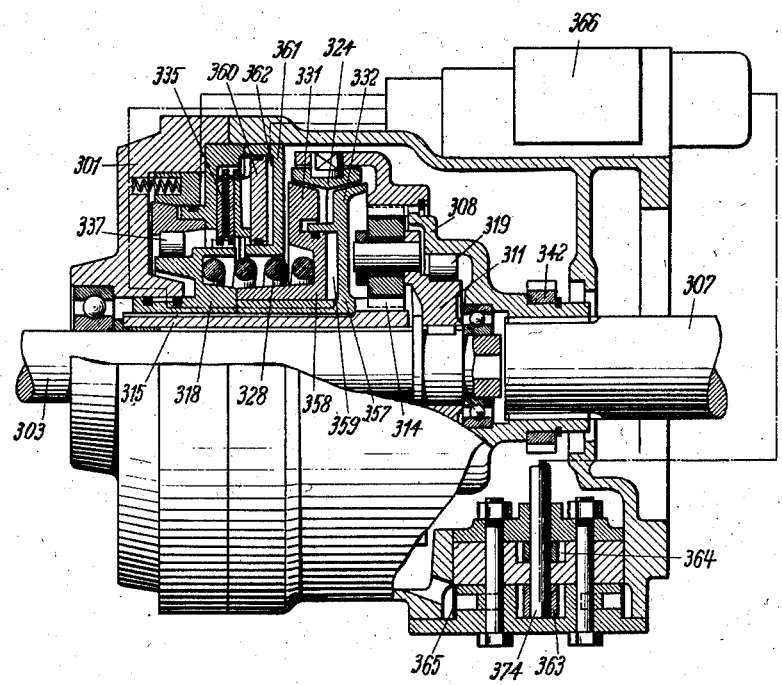
Fig. 6 is an elevation, partly in section, of still another embodiment of the present invention.

In Fig. 1 we have illustrated a variable speed transmission comprising a housing 1 composed of three sections, the right hand section being provided with a flange directly bolted to the casing 2 of the rear-axle transmission of a motor vehicle. In this housing, there is mounted an epicyclic gear comprised of three gear elements mounted for rotation about a common axis, a drive shaft 3 and a driven shaft 7. The drive shaft 3 is connected by a coupling 4 to a shaft (not shown) driven by the orthodox transmission of the motor vehicle either in a forward direction at various speeds or in a rearward direction, at the option of the driver. As will appear from Fig. 1, shaft 3 is journaled in housing 1 by means of a ball bearing 5, preferably of a type capable of taking up a certain amount of axial thrust, and its end is journaled by means of a ball-bearing 6, preferably of a similar type, within the hub-portion of a cup-shaped member 8, said hub-portion being rigid with the driven shaft 7 journaled in casing 2 by means of a duplex ball bearing 9 and carrying a bevel gear 10 adapted in the customary manner to drive the rear-axle shafts of the vehicle.

Rigidly connected with the drive shaft 3 is one of the three gear elements constituting the epicyclic gear, in the present embodiment the carrier 11 of a number of planetary gears 13, such carrier being formed by a disk in which a number of studs 12 are rigidly mounted, each stud 12 bearing one planetary gear 13 rotatable thereon. The two other gear elements constituting the epicyclic gear are solar gears including ring gear 22 and sun gear 14 both mounted co-axially with the two shafts 3 and 7 and with the gear element (carrier) 11 for permanent engagement with the planetary gears 13.

In the present embodiment, the solar or ring gear 22 is connected for common rotation with the driven shaft 7, while the solar or sun gear 14 is adapted to be either arrested by means of a brake 34, 35, 27 or to be clutched to one of the two other gear elements, in the present embodiment to the outer solar gear 22 by means of a friction clutch 32, 24, 31, as will appear in detail hereinafter.

The solar gear 14 is integral with a sleeve 15 surrounding shaft 3 and slightly spaced therefrom so as to form a gap 21. The sleeve 15 is splined on its outside and engages a bushing 17 splined on its inside being thus mounted for common rotation with but relative axial displacement to sleeve 15.

The ball bearing 5 is mounted on an annular member 20 splined on shaft 3 and extending towards the right with reference to Fig. 1 beyond the ball bearing 5. Said extension is surrounded by a ring-shaped member 18 having a sleeve 70 surrounding shaft 3 and slightly spaced therefrom. Sleeve 70 is splined on its outside and engages bushing 17 splined on its inside and is thus mounted for common rotation with but permitting relative axial displacement with respect to sleeve 70. For a purpose to be explained later, a one-way clutch is interposed between the elements 11 and 14 of the epicyclic gear, such one way clutch being formed by jamming rollers 19 inserted in pockets provided in the periphery of the extension of the member 20 and engaging the inner periphery of the member 18, as illustrated in Fig. 4. It will be noted that each of the pockets accommodating the rollers 19 has a bottom 54 slightly inclined to a circle co-axial with shaft 3 and that each of the rollers 19 is being urged by a helical spring 52 to move outwardly along the inclined bottom 54 and is thus wedged between the latter and the inner circumferential face of the ring-shaped member 18. When shaft 3 revolves in the direction indicated by the arrow x in Fig. 4, the solar gear 14 connected with member 18 for common rotation is prevented by the jamming effect of the rollers 19 from overtaking shaft 3. However, the one-way clutch constituted by the elements 18, 19 and 20 does not prevent shaft 3 from revolving at a higher speed in clockwise direction than the solar gear 14.

Owing to the provision of the gap 21, the solar gear 14 is floatingly mounted and is supported by the rollers 19 and is thereby capable of adjusting itself for engagement with the planetary gears 13 at equal tooth pressures therewith, such adjustment taking place transversely to shaft 3. In this manner the torque to be transmitted between the solar gear 14 and the planetary gear carrier 11 will be equally distributed between the various planetary gears 13.

A similar floating arrangement may be provided for the external solar gear 22. The cup-shaped member 8 rigid with the driven shaft 7 has an external flange which abuts against the end faces of the internal gear teeth of the ring-shaped member 22 and extends between said end faces and a split ring 69 inserted in an internal groove provided in the internal face of member 22, the diameter of said internal face exceeding that of the flange so as to provide for play permitting the solar gear member 22 to adjust itself in the radial direction. In order to connect the elements 8 and 22 for common rotation both are provided with engaging teeth shown at 23 having the required radial play for the radial adjusting movement, while no play is provided for an axial displacement of solar gear 22 with respect to member 8. The gear member 22 has a conical rim 24 forming part of the aforementioned clutch for connection with the gear member 14 for common rotation therewith. If that clutch is engaged, the transmission is set to "direct," the driven shaft 7 being driven at the same speed as shaft 3.

The clutch may be engaged or disengaged by axial displacement of bushing 17. This bushing is provided with a flanged ring 29 which in its turn abuts against a sleeve 71 integral with a disk 25 and held in position on the bushing 17 by an annular nut 72. The disk 25 extends towards the periphery of casing 1 and is formed integral with a cylinder 26 accommodating a power-driven member constituted in this embodiment by a disk-shaped piston 27 operable by fluid-pressure. The piston 27 is integral with a guiding sleeve slidably mounted on the sleeve 71. A biased helical spring 28 surrounding the sleeve of disk 25 is inserted between piston 27 and flanged ring 29 and thus tends to urge the piston 27 and the disk 25 towards one another. The piston 27 is rigidly connected by a plurality of bolts 30 with a conical annular clutch ring 31 adapted to engage rim 24 on the inside, whereas the cylinder 26 is rigidly connected by a plurality of bolts 33 with a second annular clutch ring 32 having a conical internal face that may engage rim 24 on the outside. Hence, the spring 28 tends to move ring 32 to the left with reference to ring 31 thus engaging the clutch, whereby cylinder 26 and disk 25 will be connected with the gear element 22 for common rotation. The sleeve 71, however, which is integral with cylinder 26 and disk 25 is splined on the bushing 17 which in its turn is splined on the sleeves 15 and 70. Therefore, engagement of the clutch 32, 24, 31 will unite the gear elements 22 and 14 for common rotation, thus setting the transmission to "direct."

The cylinder 26 carries an annular disk 34 spaced from the piston 27. Within this space there is provided a brake disk 35 which is splined on carrier 36 having a flange attached to the gear housing 1 by a number of screws. Moreover, the brake disk 35 is held against axial displacement for instance by two split rings engaging grooves provided in the carrier 36 as shown in Fig. 1.

Alternatively, in lieu of the single brake disk 35 as shown in Figure 1, a multi-disk type brake 35' may be provided which includes a plurality of, for instance three, disks which may be mounted on the carrier 36 as illustrated in Fig. 1a, such disks being splined on carrier 36 and interleaved with a corresponding number of (e. g. two) disks held by the cylinder 26 for common rotation therewith and axial displacement relative thereto, the middle one of the three disks being fixed against axial displacement on carrier 36 in any suitable manner, for instance by split rings, while the two other of the three disks are axially freely movable.

With either arrangement shown in Figure 1 or Figure 1a, respectively, the cylinder 26 and the gear 14 connected for common rotation therewith may be clutched with the housing 1 and are thereby arrested, when relative displacement of cylinder 26 and piston 27 is effected by fluid-pressure in a direction opposite to the force exerted by the spring 28.

A second one-way clutch is interposed between the gear element 14 and the housing 1. For this purpose, the ring-shaped member 18 is provided on its periphery with pockets having slanting bottom faces 55 (Fig. 4) and accommodating jamming rollers 37 pressed by helical springs 53 into contact with a ring 38 rotatably mounted in casing 1 but adapted to be clutched thereto. The jamming rollers 37 prevent the gear element 14 from rotating in a direction opposite to the arrow x in Fig. 4, if and when ring 38 is clutched to the casing 1 and is thereby arrested.

For the purpose of being arrested, the ring 38 has a conical circumferential face adapted to be engaged by the internal conical face of an annular piston 39 which is slidably mounted in an annular cavity 47 confined in housing 1 by the outer wall and by a transverse wall of the latter and by a ring-shaped member 73 mounted therein in a position surrounding the left end of the bushing 17. Helical springs 41 are inserted between the annular piston 39 and a flange provided on the member 73 and tend to disengage piston 39 from the ring 38 thereby disabling the one-way clutch 18, 37, 38. The annular piston 39 is non-rotatably secured in housing 1 by one or more pins 40 mounted in housing 1 and in member 73 extending through bores drilled in piston 39.

The hub-portion of the member 8 is provided with external helical gear teeth 42 adapted to drive a rotary oil pump. While that pump is not shown in Fig. 1 it is similar in design to a pump shown in Fig. 6. The helical gear teeth 42 mesh with a helical gear (not shown) attached to the upper end of a vertical shaft 374 on which two gears 363 and 364 are mounted. Each of those gears forms part of a gear oil pump provided near the bottom of the housing 1. The oil collecting at the bottom of housing 1 enters the pump including gear 363 through a filter 365 and is fed by that pump to the pump including gear 364. That pump feeds the oil to a control device 366 mounted on top of casing 1 and adapted to supply the pressure-fluid to two ducts 43 and 46 provided in housing 1, as shown in Fig. 1, duct 46 leading to the cylinder space 47 accommodating piston 39 while duct 43 leads to radial grooves 44 provided in the left end of bushing 17 and thence to a longitudinal conduit formed between bushing 17 and sleeve 71, and from there through radial holes into space 45 between the disk 25 and the piston 27.

The operation of our novel transmission is as follows:

When the vehicle is standing still, the driven shaft 7 is at rest. The same applies to the pump drive shaft 374. No pressure-fluid is supplied to the cylinder 26. Therefore, the spring 28 will urge the disk 25 and piston 27 towards one another both being freely movable in the axial direction. As a result, the clutch rings 32 and 31 will engage the conical rim 24 and firmly grip the same between them, thus clutching the gear elements 14 and 22. As a result, the epicyclic gear will revolve as a unit whereby the driving shaft 3 will be rigidly connected with the driven shaft 7, this being the condition of the "direct gear." In this condition the motor can drive the vehicle or the latter can drive the motor, for instance when driving downhill.

Since the power transmitted through shaft 3 is distributed by the planetary gears 13 to the gear 14 and the gear 22, the clutch 32, 24, 31 needs transfer but part of the torque (e. g. 30 to 50% of the total torque) depending on the ratio of transmission. For that reason the clutch may be given comparatively small dimensions. The ring 38 is not engaged by piston 39 due to the action of spring 41 and, therefore, the one-way clutch 37 is disabled.

When the driver has started the vehicle manipulating the orthodox transmission in the customary manner by shifting gears, the pumps including gears 363 and 364 are driven and will produce a rising pressure. As soon as the speed of the vehicle surpasses a certain rate, the pressure of the oil supplied to the space 45 between the piston 27 and the cylinder disk 25 will be sufficient to overcome the spring 28 thereby initiating the gear shifting operation in which first the clutch 32, 24, 31 is disengaged and, shortly afterwards, the brake 34, 35, 27 is operated.

As a result, gear 14 is held stationary, while the planetary gears 13 roll on it and drive gear 22 and shaft 7 at a speed higher than that of shaft 3 of the planetary gear carrier 11.

It will thus appear that the conical clutch 32, 24, 31 and the brake 34, 35, 27 co-operate to constitute a gear ratio shifting mechanism. Both, the clutch and the brake, constitute friction means one of which is operative while the other is disabled. For this purpose, the disk 35 or the middle one of the three disks 35' is held against axial displacement, thus enabling piston and cylinder to positively disengage both clutch rings 31 and 32 from the conical rim 24, when the brake 35 is rendered operative.

Owing to such arrangement it is also possible to assemble the entire transmission as a unit outside of the vehicle and to subsequently install the unit connecting it with the rear axle transmission and with the motor driven shaft without the necessity of any compensation for inaccuracies as might occur between the housing of our supplemental transmission and the rear axle transmission.

The laminated brake including the disks 35' has the advantage over the brake including the single disk 35 of requiring a lesser operating force, while the latter has the advantage of greater simplicity and both of positive engagement and disengagement excluding any residual friction and wear in disengaged condition.

Under normal conditions, the driving torque exerted on shaft 3 by the engine driving the vehicle and acting in the direction of the arrow $x$ produces, by action of the planetary gears 13, a torque in the same direction acting on the solar gear 14. Upon disengagement of the clutch 32, 24, 31 releasing gear 14, the latter will tend, therefore, to overtake shaft 3 but is prevented from doing so by the one-way clutch 18, 19, 20. Hence, the three elements 11, 14 and 22 will continue upon disengagement of clutch 32, 24, 31 to revolve in unison, the one-way clutch maintaining the positive power transfer from shaft 3 to shaft 7 in "direct" gear. Since the reactionary torque exerted on gear 14 taken up by the one-way clutch is only a fraction of the total torque transmitted, the balance being transmitted through gear 22, the one-way clutch 18, 19, 20 may have comparatively small dimensions.

The shifting operation initiated by fluid under pressure fed into the space 45 will result in the engagement of the brake 35 or 35' whereby the solar gear 14 is clutched to housing 1 and is thus arrested. As a result, the gear is shifted from the low direct speed to high speed or over-drive, the driven shaft 7 rotating at a higher speed than the driving shaft 3.

From the foregoing explanation of the operation of our improved supplemental transmission it will become apparent that after clutch 31, 24, 32 has been disengaged and before the brake 35 or 35' has been engaged, the driving shaft 3 transmits a torque in the direction of arrow $x$ only. Should it happen during that interval that the torque is reversed, for instance owing to a deceleration of the engine or by reason of a down-grade travel of the vehicle, the solar gear 14 will be slowed down and commence to revolve slower than shaft 3 and finally come to a stop. In the absence of the second one-way clutch 18, 37, 38, the solar gear 14 could even reverse its rotation and the power transmission would be interrupted. This is prevented, however, by the second one-way clutch which has been rendered effective by the supply of fluid under pressure through duct 46 to the annular cylinder 47 causing piston 39 to arrest the clutch ring 38. Hence, the two one-way clutches will positively maintain a driving connection or power transmission between shaft 3 and 7 during the gear shifting operation. Preferably, the dimensions of the cylinder space 47 and the springs 41 are so correlated that the second one-way clutch 18, 37, 38 will be rendered effective when the speed of shaft 7 surpasses a comparatively low rate, the oil pressure produced at that rate being sufficient to enable piston 39 to overcome the action of the springs 41 and to wedge piston 39 on the ring 38 arresting the same.

When the vehicle is slowed down after the transmission has been shifted to high gear, the gear will be automatically shifted to "direct" as soon as the vehicle speed drops below a certain rate which is preferably somewhat lower than the critical rate at which the supplemental transmission was shifted to "high," such operation being performed by the spring 28 overcoming the fluid-pressure in space 45. In this operation the brake 35 or 35' is disengaged and, after a certain interval, the friction clutch 32, 24, 31 is engaged. During that interval the vehicle will normally tend to slow down accelerating gear 14 which, up to this instant, had been at rest. The highest speed the solar gear 14 can thus with respect to the rotary speed of shaft 3 attain is limited by the one-way clutch 18, 19, 20. Hence, the three elements 14, 11 and 22 of the epicyclic gear will normally revolve in unison, when the friction clutch 32, 24, 31 is re-engaged whereby any shocks incident to such re-engagement are eliminated, provided, of course, that the interval between the disengagement of the brake and the engagement of the clutch gives gear 14 sufficient time to catch up with shaft 3. Obviously, the interval depends on the output of the pump in relation to the volume of space 45. Both should be so chosen as to secure the proper synchronization of the gears 14, 11 and 22 during the shifting interval.

Should it happen however, that the driving torque be reversed during the shifting interval causing gear 14 to remain at rest being held by the second one-way clutch 18, 37, 38, the engagement of the clutch 32, 24, 31 will not cause any undue or excessive shock because of the soft engagement under fluid control and because of the comparatively small relative speed of the clutch elements, the same being limited by the speed ratio of transmission. At any rate, the positive power transmission between shafts 3 and 7 will not be interrupted under any circumstances during the shifting operation.

Under any conditions the one-way clutch 19 co-operates with the one-way clutch 37 during forward travel in such a manner as to prevent the ratio of transmission from the driving shaft to the driven shaft from dropping below 1:1 and from exceeding the high speed ratio. Thus, the ratio of the numbers of revolutions of the two shafts will vary within those limits only. The one-way clutch 18, 19, 20 will become operative when the motor is driving, whereas the one-way clutch 18, 37, 38 will operate when the vehicle drives the motor.

The function of the novel transmission during backing up of the vehicle will now be considered:

When the main gear of the vehicle is put in reverse or when the vehicle is rolling backwards and the driving shaft 3 is driven in a direction of rotation opposite to the normal direction, the one-way clutch 18, 37, 38 would interfere, if rendered effective by piston 39. For that reason, means must be provided to ensure a disengagement of piston 39 from the one-way clutch member 38 whenever the vehicle is driving backwards. Such means, however, are constituted by the aforedescribed oil gear pump geared to the driven shaft 7 because a pump of that type will not feed when reversed thus being unable to supply oil under pressure to the cylinder 47 permitting springs 41 to disable the one-way clutch 18, 37, 38. In the absence of the supply of any fluid under pressure to the cylinder space 45, the transmission will be maintained by the spring 28 in "direct" condition during backward travel of the vehicle. That is necessary because the one-way clutch 18, 19, 20 would block shaft 3 against backward rotation, if the brake 35 were put in operation to arrest the cylinder 25 and member 18.

In the absence of special provisions, the one-way clutch 18, 37, 38 being disabled when the vehicle is at rest or is backing, cannot function as a mechanism for blocking the vehicle against unintended backward motion. However, special means may be provided which will permit the operators to render the one-way clutch 18, 37, 38 operative at his option when the vehicle is at rest. For this purpose a special pump driven by the engine, for instance, or an accumulator in which oil is accumulated under pressure may be provided and connected with the conduit 46 through a special valve manually operable by the driver of the vehicle. Alternatively, mechanical means or other means may be provided for putting the one-way clutch 18, 37, 38 in operation.

Should the pump driven by shaft 374, Fig. 6, or should the pressure oil supply fail for some reason or another, the transmission will be maintained in low or "direct" gear by action of the spring 28 under any circumstances. If the transmission happened to be in high gear, when the oil pressure drops accidentally, the transmission will be automatically shifted to "direct."

From the foregoing detailed description of the two embodiments of our invention illustrated in Fig. 1, it will be appreciated that the present invention is characterized by the following features:

The present invention permits the use of a power-driven element, such as piston 27, to shift the transmission into high, the power being produced in dependence on the number of rotations of a transmission shaft or in dependence on the travel of the vehicle. The vehicle is started with the transmission being in the low direct gear, the transmission being shifted into the high gear preferably automatically, when sufficient power will have been developed coincidentally to an increase of the speed of the vehicle or of the engine thereof.

This is of a particular advantage with the provision, in addition to the friction clutch, of the one-way clutch capable of taking up part of the driving torque, since in this case the one-way clutch may be partly relieved from transmitting the driving torque, for instance during the starting of the vehicle, independently of the effect of the auxiliary power. Moreover, means are provided whereby the positive power transmission from the driving shaft to the driven shaft or vice versa is ensured also during backward travel and during downgrade travel causing the vehicle to drive the engine, as is desirable to permit of the starting of the engine by pushing or towing the vehicle.

The shifting operation is performed according to the present invention by spring pressure and by a piston adapted to oppose such spring, when the auxiliary power becomes effective, for instance when the vehicle speed surpasses a certain rate, to shift from the low gear into the high gear, whereas when the auxiliary power ceases, for instance, owing to the vehicles speed dropping below a certain rate, the spring becomes effective to shift the transmission to low gear. The auxiliary power may be the pressure of a fluid supplied to a cylinder and piston revolving in unison with the gear elements.

Another feature of our invention resides in the composition of each of the two friction clutches of an axially fixed element and of at least two axially movable elements cooperating therewith and adapted to engage the fixed element from opposite sides, the various clutch elements being so interconnected pairwise and being so movable in opposite direction in a gear shifting operation that, upon engagement of either of the friction clutches for one of the two speeds, the clutch for the other speed is positively disengaged. The clutch becoming effective to shift the transmission to low gear is preferably a clutch having two conical faces whereas the clutch serving to shift the transmission to high is preferably a brake including at least one stationary disk. Owing to such a design, both clutches are so positively interconnected that upon engagement of the one clutch the other is disengaged and vice versa, thus ensuring that upon engagement of one of the two clutches the other clutch is already in disengaged condition whereby friction causing heat and wear is reduced to a minimum.

Another important feature of the present invention is the floating arrangement of the solar gear 14 or of the solar gear 22 or of both enabling the gear to freely adjust itself for mesh with the planetary gears with equal tooth pressures and with a minimum of noise irrespective of inaccuracies in the mounting of the various gears. The floating mounting of gear 22 will furthermore facilitate a proper engagement of the conical rim 24 by the rings 31 and 32 with the pressures equally distributed circumferentially.

Another important feature of our invention is the provision of the transmission with the two one-way clutches operative to limit the ratio of transmission of the driving shaft and the driven shaft to a range between an upper limit and a lower limit. This has the advantage that the ratio of transmission cannot drop below or increase beyond such range during the interval of the shifting operation which, if carried out automatically, requires a certain period of time. When one or the other limit is attained, one of the two one-way clutches will become effective to support one of the gear elements thus ensuring continued power transmission and a smooth shifting operation without shock. Preferably, the arrangement is such that during the interval after one friction clutch has been disabled and before the other one is rendered effective, the one one-way clutch prevents the ratio of transmission from dropping below a lower limit, while the other one-way clutch prevents the ratio of transmission from surpassing the upper limit.

The term "one-way clutch" is to cover any clutch which will automatically prevent relative rotation of two elements in one direction permitting rotation in the opposite direction.

When applied to a planetary gear, the one-way clutch is preferably interposed between two rotating gear elements, e. g. between the driving shaft and one solar gear or between the driving shaft and the driven shaft whereas the other one-way clutch is provided between a rotary gear element and a stationary part, e. g. between a solar gear and the housing. Preferably, the second one-way clutch may be disabled and may then permit rotation in the direction normally blocked.

According to another important feature of the invention, the second one-way clutch is disabled automatically under certain conditions, preferably depending on the direction of rotation or on the speed whereby the second one-way clutch will be disabled when the vehicle is backed up. This may be attained by fluid-operated means adapted to render the one-way clutch effective and to disable the one-way clutch when the fluid pressure drops below a certain limit, said fluid operated means co-operating with a pump driven by transmission shaft, such pump being unable to supply fluid under pressure sufficient for rendering the one-way clutch effective, when the direction of operation is reversed or when the speed of operation drops below a certain limit. Owing to that arrangement, the second one-way clutch will be automatically disabled and will thus permit the vehicle to move backwardly, as soon as the forward speed of the vehicle drops below a certain limit.

Our novel transmission may constitute a unit adapted to be interposed between the orthodox transmission and the rear axle transmission of a motor vehicle although it could be installed at other places. We have found it useful to mount the supplemental gear directly on the casing of the rear axle transmission so as to form a rigid structure therewith requiring a minimum of space and permitting the universal shaft connecting our novel transmission with the engine block to run at lower speeds. No linkage is required for the gear shifting operation, if our novel fluid pressure control means are embodied therein. If desired, however, our supplemental gear may be mounted on the casing of the orthodox gear and may be manually controlled.

In Fig. 2 illustrating still another embodiment the elements corresponding to those of the above described embodiment are designated by reference numerals obtained by the addition of 100 to those used in Fig. 1. Thus, the driving shaft designated 3 in Fig. 1 has been designated 103 in Fig. 2.

Only so much of the structure will be described, as differs in principle and function from that shown in Fig. 1. Otherwise the description of Fig. 1 applies.

In lieu of a single coaxially disposed spring 28 a plurality of helical springs 128 are provided off-set from the axis of the transmission, each spring 128 bearing against the disk 125 on the one side and against a cup-shaped member 148 on the other side, the cup-shaped member 148 being rigidly connected with the piston 127 by a bolt 130. The cup-shaped member 148 is inserted in a hole of the clutch ring 131 and has a flange bearing against the left face of the ring 131, the latter being slidably guided on a hub of the second clutch member 132.

The sleeve 115 of the gear 114 which is floatingly mounted, as described with reference to Fig. 1 carries, and is rigidly connected for common rotation, with the one-way clutch member 118, the bushing of the cylinder disk 125, and the hub portion of the clutch member 132, all of those elements being secured against axial displacement by suitable means. The outer rim of gear 122 surrounds a clutch ring 124 having two opposite internal conical faces mounted in opposed relation to the circumferential conical faces of the clutch elements 131 and 132. The ring 124 is connected with the surrounding rim of gear 122 by suitable means permitting of a relative axial and radial displacement but preventing relative rotation. Such means may be formed by studs 149 extending outwardly from the ring 124 and loosely engaging axial slots of the outer rim of gear 122. The brake comprises three disks 135 splined on member 118 and interleaved disks splined on an annular supporting member 138 attached to the housing. The left one of the three disks 135 is fixed against axial displacement on the member 118 by suitable means not shown.

Oil under pressure may be applied to the cylinder space 145 through a duct 143 provided in the housing 101 and communicating with a peripheral groove provided in a member 118 which communicates with ducts in members 118 and 125 such ducts leading to space 145. Another duct 146 provided in the housing 101 serves to supply fluid under pressure to the cylinder space 147 for the purpose of arresting the ring member 138.

The springs 128 tend to move clutch member 131 to the right towards clutch member 132, whereby ring member 124 will be clamped between them. In this operation, ring 124 may adjust itself automatically for engagement with the two clutch rings 131 and 132 with a uniformly distributed pressure irrespective of inaccuracies.

Similarly, the brake disks may adjust themselves automatically for intimate contact.

The function of this embodiment is the same as that shown in Fig. 1. When oil is pumped into duct 143, the piston 127 will be forced to the left first relieving disk 131 and later engaging brake 135. Biassed helical springs 150 inserted between clutch element 131 and 132 as shown in Fig. 3 will disengage the clutch. Detent balls 151 movable in radial bores of clutch ring 124 and subject to biassed springs inserted in such bores may be provided for the purpose of resiliently arresting ring 124 in its central position shown in Fig. 3 in which the balls 151 enter recesses provided in the rim of gear 122. This arrangement will facilitate the disengagement of ring 124 from the clutch members 132 and 131, when the latter are urged apart by fluid pressure.

In Fig. 5 illustrating an embodiment similar to that shown in Fig. 2 the parts are designated by reference numerals arrived at the addition of 200 to those used in Fig. 1. This embodiment differs from that shown in Fig. 2 by the interposition of the one-way clutch between driving shaft 203 and driven shaft 207 in lieu of between the driving shaft and the inner solar gear.

The jamming rollers 219 accommodated in pockets provided in the driving shaft 203 co-operate with the cup-shaped member 208 attached to the driven shaft 207. This arrangement offers the advantage over that shown in Fig. 1 and Fig. 2, that the pressure fluid will pass from the housing 201 to the rotary element 215 at a point 256 of a comparatively small radial distance from the axis where the counter-pressure produced in the oil by the centrifugal effect is comparatively slight. However, the one-way clutch including the jamming rollers 219 must carry a larger load, being subject to the full torque, than in the embodiments of Figs. 1 and 2. Otherwise, the function is the same as that afore-described.

Still another embodiment is illustrated in Fig. 6 in which the reference numerals used to designate the elements are formed by the addition of 300 to the reference numerals used in Fig. 1 for corresponding elements having a similar function.

This embodiment differs from those previously described primarily by the substitution for a single power-driven gear shifting member 27 or 127 of two separate pistons 358 and 360, one being operative to disengage the clutch connecting two of the gear elements to one another and the other piston 360 serving to clutch one of the gear elements to the housing thereby arresting it.

The conical clutch member 332 formed with a sleeve 357 splined on the sleeve 315 of gear 314 is so shaped as to constitute an annular cylinder space 359 adapted to accommodate an annular piston 358 integral with the clutch rim 331 and splined, in its turn, on the sleeve 357. Thus, the clutch members 331 and 332 will revolve in unison with the gear 314. A biassed helical spring 328 disposed co-axially within the transmission bears against member 318 on the left and clutch member 331 on the right and will, therefore, engage the clutch unless disabled by piston 358. The brake 335 is similar to that shown in Fig. 2 consisting of two interleaved groups of disks, one group being splined on member 318 and the other group being splined to the housing 301. The brake is operable by an annular piston 360 slidably guided within an annular cylinder 361 mounted in the housing co-axially to shaft 303 and surrounding the spring 328.

Ducts for connecting the pressure oil to the cylinder spaces 359 and 362 are provided but not shown in the drawings. They may take substantially the course indicated in Fig. 6 by dash-dotted lines. This embodiment differs from those previously described by the fact that the duct conducting pressure oil to the space 362 will not traverse any rotating element and will be therefore, free from the adverse influence of centrifugal forces. The piston 358 subjected to such centrifugal forces and the cylinder 357 accommodating it have a comparatively small diameter being mounted within the twin-cone clutch 331, 324, 332 and in axial alignment with the spring 328. The shifting operation may be performed either by simultaneous admission of fluid under pressure to both cylinder spaces 359 and 362 or by first admitting the fluid to space 359 and, after an interval of 1 to 2 seconds for instance, to space 362. The interval may be controlled by suitable means provided in a housing 366 such means including for instance a slide valve retarded by a braking piston or it may include a piston mounted in the fluid current and adapted to open the duct leading to space 362 after having moved a certain distance, such movement being delayed by a throttling effect. Means may be provided which on re-shifting the transmission to direct will first relieve space 362 only and after a certain interval will relieve space 359, such interval permitting the elements to be clutched to attain synchronism, the two one-way clutches preventing any overthrow. The main one-way clutch 319 is interposed between the cup-shaped member 308 and the carrier 311 of the planetary gears which is not integral with but made separate from and attached to the driving shaft 303.

While we have described our invention with reference to a number of different embodiments thereof, we wish it to be clearly understood, that it is in no way limited to the structural details of such embodiments but is capable of numerous modifications within the scope of the appended claims. Thus, the power-medium for shifting the gears need not be a fluid under pressure but may be an electrical current. If a fluid is used, such need not be liquid but may be gaseous. The transmission may be used for vehicles other than motor cars or for any other purposes. Some features of the invention are not limited to gears of the epicyclic type. Furthermore, the epicyclic gear may have more than one set of planetary gears. The main one-way clutch may be provided between the inner solar gear and the driven shaft or at any other suitable point of the transmission.

What we claim is:

1. In a variable speed transmission, the combination comprising an epicyclic gear set composed of three elements formed by two solar gears and by a carrier for planetary gears, means for mounting said solar gears and said carrier for rotation about a common axis, planetary gears mounted on said carrier for permanent mesh with said solar gears, a driving shaft connected with one of said elements, a driven shaft connected with another one of said elements, a first set of friction means for arresting the third one of said elements, a second set of friction means for coupling said third element with one of said two other elements, each of said set of friction means being composed of an axially fixed member and of a pair of members normally movable axially in opposite directions embracing said fixed member therebetween and movable for engagement and disengagement with respect thereto, means for interconnecting said movable members to be movable between two positions and adapted in one position to cause engagement of said first set of friction means and disengagement of said second set of friction means and adapted in the other position to cause engagement of such second set of friction means and disengagement of said first set of friction means, a spring urging said interconnecting means into one of its positions, and power-operable means for counteracting such spring and moving said interconnecting means to its other position.

2. In a speed change transmission, the combination comprising an epicyclic gear composed of three elements mounted for rotation about a common axis, said elements being formed by an inner solar gear, by an outer solar gear and by a planetary gear carrier, planetary gears mounted on said carrier for permanent engagement with said solar gears, a clutch for clutching two of said elements for low speed transmission, a brake for arresting one of said elements for high speed transmission, a cylinder mounted for common rotation with said inner solar gear, a piston movable in said cylinder, means including the two last-mentioned elements comprising said cylinder and said piston for disabling said clutch and for engaging said brake and a spring disposed to oppose movement of said piston and operative to simultaneously disengage said brake and to engage said clutch.

3. In an epicyclic gear, the combination comprising three gear elements mounted for rotation about a common axis, said elements being formed by two solar gears and by a carrier of planetary gears mounted for engagement with said solar gears, a drive-shaft connected with one of said elements, a driven shaft connected with another one of said elements, friction means for arresting the third element, friction means for coupling said third element with one of said other two elements, means including at least one piston and being adapted to disable said second friction means and to render said first friction means operative, spring means arranged to oppose said piston and to render second friction means operative, means for supplying fluid under pressure to said piston, a one-way clutch arranged to operatively connect said shafts to one another, and a one-way brake adapted to arrest said third gear element when tending to revolve in one direction.

4. In an epicyclic gear, the combination comprising three gear elements mounted for rotation about a common axis, said elements being formed by two solar gears and by a carrier of planetary gears mounted for engagement with said solar gears, a drive-shaft connected with one of said elements, a driven shaft connected with another one of said elements, friction means for arresting the third element, friction means for coupling said third element with one of said other two elements, means including at least one piston and being adapted to disable said second friction means and to render said first friction means operative, spring means arranged to oppose said piston and to render said second friction means operative, means for supplying fluid under pressure to said piston, a one-way clutch arranged to operatively connect said shafts to one another, and a one-way brake adapted to arrest said third gear element when tending to revolve in one direction, and means to disable said one-way brake.

5. In a gear-change transmission for a motor vehicle, the combination comprising an epicyclic gear composed of three elements including two solar gears and a planetary gear carrier, planetary gears mounted on said carrier in permanent mesh with said solar gears, a normally ineffective one-way brake adapted to arrest one of said three elements, a movable element adapted, when operated, to render said one-way brake effective, means exclusively and automatically responsive to the direction of travel of the vehicle and to the speed thereof for operating said movable member only whenever the vehicle travels forward at a speed exceeding a certain rate.

6. The combination set forth in claim 5 in which said means responsive to the direction of travel of the vehicle and to the speed thereof comprise a cylinder, a piston movable therein, a rotary gear pump adapted to feed a fluid to said cylinder, and means to drive said pump in dependence on the travel of the vehicle.

7. In a gear-change transmission for a motor vehicle, the combination comprising an epicyclic gear set composed of three elements including two solar gears and a planetary gear carrier, planetary gears mounted on said carrier in permanent mesh with said solar gears, a rotatable member, a one-way brake interposed between said rotary member and one of said three elements, a movable clamping element, means for holding said movable clamping element against rotation, a piston adapted to move said clamping elements against said rotary member for arresting the same, a cylinder accommodating said piston, a pump for feeding a fluid to said cylinder and means for driving said pump only from the output of said transmission to produce adequate pressure for moving said piston and thereby render said one-way brake effective only if the speed of the vehicle exceeds a predetermined speed.

8. In a speed-change transmission the combination comprising a housing, an epicyclic gear set formed of three gear members, namely, two solar gears and a planetary gear carrier with planetary gears mounted on the carrier and in constant mesh with the solar gears, means for connecting two of the said gear members with each other, means for braking one of the said gear members against the housing, a cylinder rotating with the epicyclic gear set having a piston to actuate the said connecting means, a cylinder rigidly connected with the housing and having a piston, the two cylinders being arranged alongside the epicyclic gear set co-axially with the axis thereof and the rotating cylinder having a relatively small outer diameter while the stationary cylinder has a relatively large outer diameter.

9. In a speed-change transmission, the combination comprising a housing, a drive shaft, an epicyclic gear set formed by two solar gears, a planetary gear carrier and planetary gears mounted on said planetary gear carrier and in constant mesh with said solar gears, a bearing sleeve surrounding the drive shaft for the inner solar gear bearing the solar gear at one end and being rotatably supported only at the other end on the drive shaft so that it allows the inner solar gear to float for radial self-adjustment with respect to said planetary gears, another sleeve surrounding the said bearing sleeve and splined thereto, a brake arranged concentrically to the drive shaft which may connect said second sleeve with the housing, a clutch also arranged concentrically to the drive shaft which connects said second sleeve with the other solar gear, a freewheeling device between the bearing sleeve for the inner solar gear and the housing and a device adapted to release the said free-wheeling device so that it makes possible rotation of the inner solar gear in both directions of rotation.

10. In a speed-change transmission, the combination comprising a housing, a drive shaft, an epicyclic gear set formed by two solar gears, a planetary gear carrier and planetary gears mounted on the planetary gear carrier and in constant mesh with said solar gears, an axially displaceable cylinder coupled with the one solar gear for rotation therewith, a piston axially displaceable in said cylinder with means to secure the cylinder and piston with each other for rotation together, means including conical friction surfaces to connect the cylinder and the piston with the other of the two said solar gears, means to connect the cylinder and the piston with the housing in order to brake said first-mentioned solar gear, a spring adapted to move the piston and cylinder toward each other and fluid means for moving the piston and cylinder away from each other against the action of said spring in such a manner that by actuation of said last-mentioned means to overcome said spring either one of the two connecting means or the other of the two connecting means is alternately brought into action.

11. In a speed-change transmission the combination, according to claim 45 in which the inner and the outer according to claim 10 in which the inner and the outer of the two solar gears each have a hub extended towards the epicyclic gear set, the cylinder and piston are arranged directly alongside of the epicyclic gear set co-axially with the axis of the latter on the extended hub of the inner solar gear, the connecting means for connecting the cylinder and piston with the other solar gear co-operate with the extended hub of the outer solar gear, and wherein the said spring is arranged essentially within the inner diameter of the two said connecting means.

12. In an epicyclic gear, the combination comprising three gear elements mounted for rotation about a common axis, said elements being formed by two solar gears and by a carrier of planetary gears mounted for engagement with said solar gears, a drive shaft connected with one of said elements, a driven shaft connected with another of said elements, first friction means for arresting the third element, second friction means for coupling said third element with one of said other two elements, means including at least one piston for disabling said second friction means and for rendering said first friction means operative, spring means opposing said piston and normally rendering said second friction means operative, means for supplying a fluid under pressure to said piston, and means connected to one of said shafts for driving said last-mentioned means, said second friction means including an annular member having two opposite conical faces, means for mounting said annular member on one of said gear elements for relative axial displacement, a first coupling member having a conical face and attached to another one of said gear elements and located on one side of said annular member, and a second coupling member having a conical face mounted for axial movement on the other side of said annular member and operative under the influence of said spring means to press said annular member against said first coupling member.

13. In an epicyclic gear, the combination comprising three gear elements mounted for rotation about a common axis, said elements being formed by two solar gears and by a carrier of planetary gears mounted for engagement with said solar gears, a drive shaft connected with one of said elements, a driven shaft connected with another one of said elements, first friction means for arresting the third element, second friction means for coupling said third element with one of said two other elements, means including at least one piston or disabling said second friction means and for rendering said first friction means operative, spring means opposing said piston and normally rendering said friction means operative, means for supplying fluid under pressure to said piston, means connected to one of said shafts for driving said last-mentioned means, said second friction means comprising an annular member having two opposite conical faces, means for mounting said annular member on one of said gear elements for relative axial displacement, a first coupling member having a conical face attached to another one of said gear elements and located on one side of said annular member, a second coupling member having a conical face mounted for axial movement on the other side of said annular member and operative under the influence of said spring means to place said annular member against said first coupling member, and means for resiliently detaining said annular member in a predetermined position axially of the gear element on which it is mounted.

14. In a variable speed transmission the combination comprising a housing, an epicyclic gear composed of three elements formed by two solar gears and by a planetary gear carrier, means for mounting said three elements in said housing for rotation about substantially a common axis, planetary gears mounted on said carrier in permanent mesh with said solar gears, means for clutching two of said elements together for low speed transmission, means for connecting one of said elements to said housing for high speed transmission, a first one-way connecting device provided between two of said three elements, a second one-way connecting device between said housing and one of said two last-mentioned elements, and means for optionally disabling said second one-way connecting device.

15. In a change speed transmission for a motor vehicle the combination comprising a shaft, a one-way brake, means for rendering said one-way brake effective and ineffective, said one-way brake being operative upon being rendered effective to arrest said shaft when tending to rotate in a predetermined direction, a movable member for rendering said one-way brake effective, and means responsive to the direction of travel of the vehicle and to the speed thereof for causing said movable member to automatically render said brake ineffective unless the vehicle travels in a forward direction at a speed exceeding a certain predetermined rate.

16. In a variable speed transmission the combination comprising a housing, an epicyclic gear composed of three elements formed by two solar gears and by a planetary gear carrier, means for mounting said three elements in said housing for rotation about substantially a common axis, planetary gears mounted on said carrier in permanent mesh with said solar gears, means for clutching two of said elements together for low speed transmission, means for connecting one of said elements to said housing for high speed transmission, a first one-way connecting device between two of said three elements, a second one-way connecting device between said housing and one of said two elements co-operating with said first one-way connecting device and means driven by the vehicle and operative only during forward travel of the vehicle for rendering said second one-way connecting device operative.

17. The combination in accordance with claim 16 wherein the last-named means includes a hydraulic pump.

18. In a change-speed transmission, the combination comprising a shaft, a planetary gear including an inner solar gear, a planetary gear carrier, an outer solar gear with inclined internal and external friction surfaces, planetary gears mounted on said carrier for permanent mesh with said solar gears, selectively engageable means engaging with said friction surfaces to connect said inner solar gear with said outer solar gear to thereby lock said planetary gear, and means connecting said shaft with said outer solar gear including a lost motion connection between said outer solar gear and said last-mentioned means to hold said outer solar gear in a floating condition for radial self-adjustment with respect to said planetary gears to thereby facilitate proper engagement of said friction surfaces with said connecting means.

19. In a change-speed transmission, the combination according to claim 18, further comprising bearing means for indirectly journalling said inner solar gear to hold the same in floating condition to enable radial adjustment thereof including an axially extending hub portion at said inner solar gear, a second hub portion displaced with respect to said first-mentioned hub portion in the axial direction thereof, and an intermediate member co-extensive with a portion of both of said hub portions and connected with each of said hub portions by means of a lost motion connection so as to enable said inner solar gear to adjust itself radially.

References Cited in the file of this patent
UNITED STATES PATENTS

| | | |
|---|---|---|
| 1,861,008 | Hayes | May 31, 1932 |
| 1,915,374 | Mobius | June 27, 1933 |
| 2,023,018 | Hamilton | Dec. 3, 1935 |
| 2,034,087 | Chilton | Mar. 17, 1936 |
| 2,097,021 | De Normanville | Oct. 26, 1937 |
| 2,115,963 | Osborne | May 3, 1938 |
| 2,225,121 | Lundquist | Dec. 17, 1940 |
| 2,238,746 | Neracher | Apr. 15, 1941 |
| 2,241,680 | Taylor | May 13, 1941 |
| 2,242,519 | Frank | May 20, 1941 |
| 2,262,747 | Banker | Nov. 18, 1941 |
| 2,288,594 | Neracher | July 7, 1942 |
| 2,299,387 | Groll | Oct. 20, 1942 |
| 2,332,061 | Conkle | Oct. 19, 1943 |
| 2,348,424 | Shorter | May 9, 1944 |
| 2,349,410 | De Normanville | May 23, 1944 |
| 2,371,564 | Wemp | Mar. 13, 1945 |
| 2,399,097 | Carmagua | Apr. 23, 1946 |
| 2,403,579 | Carpenter | July 9, 1946 |
| 2,437,517 | Greenlee | Mar. 9, 1948 |
| 2,516,208 | Hasbany | July 25, 1950 |
| 2,543,811 | Snow et al. | Mar. 6, 1951 |
| 2,700,311 | Bade | Jan. 25, 1955 |
| 2,703,021 | Stoeckicht | Mar. 1, 1955 |
| 2,716,359 | Forster | Aug. 30, 1955 |

FOREIGN PATENTS

| | | |
|---|---|---|
| 180,226 | Switzerland | Jan. 2, 1936 |
| 472,953 | Great Britain | Oct. 4, 1937 |
| 477,530 | Great Britain | Jan. 3, 1938 |
| 699,889 | Germany | Jan. 5, 1939 |